United States Patent [19]
Iwama et al.

[11] 4,200,372
[45] Apr. 29, 1980

[54] AUTOMATIC APERTURE PRESETTING AND EXPOSURE CONTROL DEVICE FOR CAMERA

[75] Inventors: Hideto Iwama, Kawasaki; Masamichi Toyama, Machida, both of Japan

[73] Assignee: Canon Kabushiki Kaisha, Tokyo, Japan

[21] Appl. No.: 899,339

[22] Filed: Apr. 24, 1978

[30] Foreign Application Priority Data

Apr. 28, 1977 [JP] Japan .................... 52-49473

[51] Int. Cl.² ............................. G03B 7/08
[52] U.S. Cl. ........................... 354/43; 352/141
[58] Field of Search ............ 354/43, 44, 40, 79, 354/271, 42; 352/141

[56] References Cited

U.S. PATENT DOCUMENTS

| 3,833,913 | 9/1974 | Wick et al. | 354/42 |
| 4,101,910 | 7/1978 | Mayer | 354/42 |

FOREIGN PATENT DOCUMENTS 5017223  2/1975  Japan ........................ 352/141

Primary Examiner—L. T. Hix
Assistant Examiner—William B. Perkey
Attorney, Agent, or Firm—Toren, McGeady and Stanger

[57] ABSTRACT

In the disclosed automatic exposure control device for a motion picture camera and so on, a diaphragm driving arrangement drives a diaphragm arrangement. An exposure control arrangement having a light sensing element for sensing scene light and producing an electrical output corresponding to the scene brightness, controls the diaphragm driving arrangement on the basis of the output of the light sensing element, the sensitivity information of the film to be used and so on, so that a proper exposure can be obtained. A diaphragm presetting arrangement electrically controls the diaphragm driving arrangement independently of the exposure control arrangement to set the diaphragm arrangement at an intermediate opening position. A selector normally disables the control of the diaphragm driving arrangement by means of the exposure control arrangement and enables the control of the diaphragm driving arrangement by arrangement of the diaphragm presetting means. However, in response to the operation of the camera release, enables control of the diaphragm driving arrangement by the diaphragm presetting arrangement, and enables the control of the diaphragm driving arrangement by means of the exposure control arrangement. In consequence, before the camera as been released the diaphragm arrangement is always preset at the intermediate open position by means of the diaphragm presetting arrangement. Hence even when the brightness of the object to be photographed is very low, the response delay of the light sensing element is improved in and at the time of camera release and the diaphragm arrangement is quickly adjusted to a position for producing giving a proper exposure with the exposure control means.

16 Claims, 7 Drawing Figures

PRIOR ART

AUTOMATIC APERTURE PRESETTING AND EXPOSURE CONTROL DEVICE FOR CAMERA

BACKGROUND OF THE INVENTION

1. Field of the Invention

The present invention relates to an automatic exposure control device for motion picture camera and other devices and particularly to an improvement of the automatic exposure control device in which a diaphragm driving arrangement keeps a diaphragm arrangement at a position corresponding to the smallest or the largest opening when the camera is not operating, and when a current is supplied to the device an electrical diaphragm presetting arrangement operates before camera release to automatically preset the diaphragm arrangement at an intermediate opening position between the largest and the smallest opening positions, and when the camera is released an exposure control device operates so as to adjust the diaphragm means to an opening for providing a proper exposure.

2. Description of the Prior Art

Most of the recent motion picture camera is equipped with an automatic exposure control device, and, therefore, able to obtain pictures under proper exposure easily. Hereby, this kind of automatic exposure control device is usually operated by the camera release operation in order to simplify the camera handling. Namely, together with the switch for controlling the current supply to the camera driving motor for driving the shutter mechanism, the film feeding mechanism and so on, the switch for controlling the current supply to the automatic exposure control device is operatively associated with the camera release button in order to simplify the camera handling. In case of the camera so designed that the switch for the automatic exposure control device and the switch for the camera driving motor are controlled by means of the camera release button, it is usual that the switch for controlling the current supply to the automatic exposure control device is actuated with the first stroke of the release button and then the switch for controlling the current supply to the camera driving motor is actuated with the second stroke.

The reason why an interval is provided between the time at which the switch for the automatic control device is actuated and the time at which the switch for the automatic control device is actuated is mainly as follows. Namely in case of this kind of the automatic exposure control device, as diaphragm driving means for driving the diaphragm in response to the output of the exposure control means for determining a proper aperture value on the basis of the output of the light sensing element and other exposure factors such as the film sensitivity information and so on, an exposure meter is mainly used. Hereby, as is usually known, this kind of exposure meter is influenced by the force of a spring, so that when the device is out of operation, the diaphragm means is held at the smallest or the largest opening position. Consequently, if the switch for the automatic exposure control device and that for the camera driving motor are actuated completely at the same time, the photographing is started before the diaphragm means is adjusted at an opening position for giving a proper exposure in accordance with the output of the exposure control means, so that the initial scene of the photography is under-exposed quite badly. Consequently, at the time of camera release, the switch for the automatic exposure control device should be actuated, before the switch for the camera driving motor is actuated, so that the photographing is started after the diaphragm means has been adjusted at an opening position for giving a proper exposure in accordance with the output of the exposure control means, so as to solve the problem of improper exposure at the initial scene.

Nevertheless, in case of this kind of camera, the above mentioned problem of improper exposure at the initial scene becomes remarkable at times. Namely, in case of this kind of camera, when the release button is operated comparatively slowly, a sufficient time during which the diaphragm means is adjusted at the opening position for giving a proper exposure can be obtained and, therefore, there takes place no problem. On the other hand, when the release button is operated abruptly, the time during which the diaphragm means is adjusted at the opening position for giving a proper exposure can hardly be obtained, so that the photographing is started before the diaphragm means has been adjusted at the opening position for giving a proper exposure, whereby the initial scene is improperly exposed in the same way as in the afore mentioned case.

In view of such an inconvenience as mentioned above, an automatic exposure control device so designed that the diaphragm means is once preset at an intermediate position between the smallest and the largest opening positions at taking picture before the camera release so as to eliminate the difficulties of the improper exposure at the initial scene has been proposed. Namely, according to Japanese Patent Laid-Open Publication No. Sho 50-17223 (Title "Exposure Meter Device", published on Feb. 24, 1975) of the assignee of the present patent application, an automatic exposure control device is proposed, in which the afore mentioned exposure meter as the diaphragm driving means is connected to an exposure control circuit as exposure control means including a light sensing element for measuring the brightness of the object to be photographed and a variable resistance for inputting the film sensitivity information and a resistance as an electrical presetting means for presetting the diaphragm means at the afore mentioned opening position before the camera release, is connected to the afore mentioned exposure control circuit so as to cooperate with said variable resistance. Further, a switch is provided as a change-over means which makes a resistance circuit consisting of the afore mentioned diaphragm presetting resistance and the variable resistance for inputting the film sensitivity information connected to a power source built in the camera body, and electrically excludes the afore mentioned light sensing element in the state before the camera release, but connects the exposure control circuit consisting of the light sensing element and the variable resistance for inputting the film sensitivity information to the power source through a constant voltage circuit and electrically excludes the diaphragm presetting resistance with the first stroke when the camera is released. According to such a construction of the automatic exposure control device, when the power-source switch is closed at taking pictures, the diaphragm means is always preset at the afore mentioned intermediate opening position by the effect of the resistance circuit consisting of the afore mentioned diaphragm presetting resistance and the variable resistance for inputting the film sensitivity information before the camera is released, so that the inconvenience of the improper exposure at the initial scene can be eliminated even when the camera is released abruptly. Especially in case of this device since the diaphragm presetting resistance circuit includes the resistance for inputting the film sensitivity information, the diaphragm presetting position alters in accordance with the sensitivity of the film to be used in such a manner that when a high sensitivity film is used the diaphragm means is preset at a comparatively small opening position while when a low sensitivity film is used the diaphragm means is preset at a comparatively large opening position which is quite rational.

The following is advantageous when the system forms an open loop, but is disadvangageous when it forms a closed loop. Throughout the specification, the term "non-servo" is used to identify an open loop arrangement and "servo" is used for a feedback or closed loop arrangement. In an open loop exposure control system, light from the object strikes a light receiving element without passing a diaphragm that is controlled by the system. In a closed loop or servo arrangement, light from the object strikes the light sensing element only after passing through a diaphragm. The diaphragm may be either the diaphragm in the objective lens, or a diaphragm specifically placed in front of the censor and coupled to the objective diaphragm to open and close therewith. In the closed loop arrangement, the light sensing element in the exposure control circuit receives the light passing through the diaphragm, so that if the preset position of the diaphragm changes in accordance with the film sensitivity, the amount of light incident upon the light sensing element changes accordingly. Thereby in case a film with a comparatively low sensitivity is used, the diaphragm means is preset at a comparatively large opening position correspondingly, so that the amount of the light incident upon the light sensing element is also comparatively large, whereby there takes place no such important problem, while in case a film with a very high sensitivity is used, the diaphragm means is preset at a small opening position correspondingly, so that the amount of the light incident upon the light sensing element is also small, whereby the problem of the response delay of the light sensing element becomes especially remarkable. Namely, in such a device as mentioned above a photoconductive element such as a CdS and so on is usually applied as the light sensing element, however, the photo-conductive element is not satisfactory in response especially for the light with low brightness, so that in case the light is of low brightness, it takes comparatively a long time for the output to reach the level corresponding to the light incident thereupon. Now let us suppose that the sensitivity of the film to be used is as high as ASA 160, while at first the diaphragm means is set at the aperture value f45 and the brightness of the object to be photographed is so low that the diaphragm means is to be set at the aperture value f1.4 in order to obtain a proper exposure. Hereby it takes such a long time as 15-30 sec. for the diaphragm means with f45 to reach f1.4. Hereby, taking it into consideration that the response delay of the diaphragm means basing upon the mechanical engagement of the diaphragm means with the exposure meter is almost negligible (for example, as short as 0.5 sec.), the above mentioned time of 15-30 sec. is almost due to the response delay of the light sensing element. Of course the above is an extreme example, however, the response of the photo-conductive element is usually inferior for the light with low brightness. Consequently, if the afore mentioned diaphragm presetting device is applied to the automatic exposure control device of the servotype in which a photo conductive element is used as light sensing element, when an object with a low brightness is photographed with a film with an especially high sensitivity the diaphragm means is preset at a position corresponding to a small opening, while further the amount of the light incident upon the light sensing element is remarkably small because of the low brightness of the object to be photographed, so that in this case the initial scene is under exposed due to the response delay of the light measuring element. As explained above, the feature that the diahragm presetting position changes in accordance with the sensitivity of the film to be used is, on the contrary, inconvenient for the device of servo-type.

Beside the above, in said proposed device, a current is supplied thereto through the constant voltage circuit whereby a power less takes place in the constant voltage circuit, which adds to the inconvenience.

Further, in the proposed device, as the change over means, so called transfer switch which is changed over from the contact connected to the diaphragm presetting resistance to the contact connected to the constant voltage circuit (to which the afore mentioned exposure control circuit is connected) in response to the camera release is used, however, in case the transfer switch is used as change over means the change over operation is carried out slowly for example when the release button is operated very slowly, so that there is a danger that before the start of the current supply to the exposure control circuit the once preset diaphragm means should be sifted, under the effect of the spring working upon the exposure meter, to the stop position in unoperative state of the device, namely the position corresponding to the smallest or the largest opening. In such a case, the problem of the improper exposure of the initial scene becomes remarkable again despite the diaphragm presetting device.

SUMMARY OF THE INVENTION

The main object of the present invention is to offer an improved automatic exposure control device with an improved diaphragm presetting means in which the effect of the diaphragm presetting means can fully be obtained without fear of the problem of the improper exposure at the initial scene even when applied to the servo-type device, and which can fully eliminate such a shortcoming of the diaphragm presetting means of the conventional automatic exposure control device that in case applied to the automatic exposure control device of the servo-type, the problem of the improper exposure of the initial scene becomes remarkable again under some conditions, for example, when an object with low brightness is to be photographed with a film with high sensitivity.

For the above mentioned main object, the present invention proposes a novel automatic exposure control device so designed that an electrical diaphragm presetting means for presetting the diaphragm means at the intermediate opening position between the smallest and the largest opening before the camera release, can operate completely independent of an exposure control means including a light sensing element for measuring the object brightness and an electrical means for inputting the film sensitivity information. In case of this device, the diaphragm presetting position is determined only by means of the above mentioned diaphragm presetting means, having nothing to do with the sensitivity of the film to be used, so that even in case of the servo-type device the problem of the improper exposure of the initial scene can completely and profitably be eliminated. Hereby, it is true that the rationality of the conventional device does not exist any more, while on the other hand, the device in accordance with the present invention can profitably applied the servo-type device, too, enjoying the universality.

Another object of the present invention is to offer an automatic exposure control device which can greatly decrease the waste of the power source.

For this object, according to a preferable embodiment of the present invention, the automatic exposure control device is designed in such a manner that an exposure meter as diaphragm driving means is connected to the output terminal of a bridge circuit consisting of the light sensing element, a variable resistance for inputting the film sensitivity and other resistances, each as one leg of the bridge circuit. In case of this automatic exposure control device, any additional circuit as constant voltage circuit is not necessary at all in order to operate the exposure control device and therefore, the loss of the electrical power can largely be decreased.

Further another object of the present invention is to offer an automatic exposure control device which can instantly change over from the diaphragm presetting means to the exposure control means in response to the camera release, in no matter how slowly the release button is operated and can eliminate the difficulty which arises in case so called transfer switch is applied as change over means.

For this purpose, according to a preferable embodiment of the present invention, the automatic exposure control device is designed in such a manner that as the change over means, a combination of a semi-conductor switching element such as transistor and an ordinary mechanical ON-OFF switch connected to the control terminal of the switching element is adopted instead of said transfer switch, wherein the afore mentioned diaphragm presetting means is connected to the switching element (or to the mechanical switch) while the afore mentioned exposure meter is connected to the mechanical switch (or to the switching element). According to this embodiment, when the mechanical switch is closed or opened by the operation of the release button, the switching element is instantly opened or closed, so that the change over from the diaphragm presetting means to the exposure control means is carried out instantly, thereby the difficulty which arises in case the transfer switch is used as change over means and when the release button is operated slowly, is profitably avoided.

Further another object of the present invention is to offer an automatic exposure control device in which the afore mentioned diaphragm presetting means can further effect another function beside the diaphragm presetting function.

For this purpose, according to a preferable embodiment of the present invention, the automatic exposure control device so designed in such a manner that as the afore mentioned electrical diaphragm presetting means, a light emitting lamp which acts as load resistance when it is lit is adopted. According to this embodiment, when a current is supplied to the device, the lamp is lit so as to indicate that a current is supplied to the device properly while the diaphragm is preset by means of the load resistance of the lamp, which is very rational.

Further, another objects and features of the present invention will become clear out of the explanations to be made later in accordance with the accompanying drawings of the embodiments.

DETAILED DESCRIPTION OF THE PREFERRED EMBODIMENTS

Before explaining the embodiments in accordance with the present invention, the automatic exposure control device proposed by the afore mentioned Japanese Patent Laid-Open Publication No. Sho. 50-17223 will be explained in accordance with FIG. 1.

Figure 1:
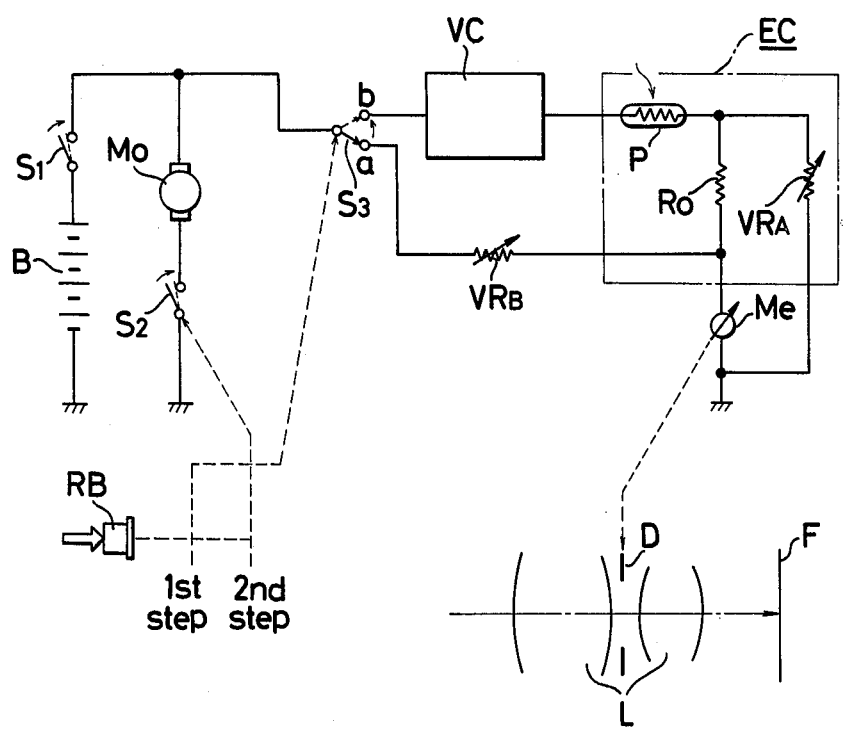
FIG. 1 shows the circuit diagram of the automatic exposure control device proposed by the afore mentioned Japanese Patent Laid-Open Publication No. Sho 50-17223.

In FIG. 1, B is a power source, S1 is a power source switch manually operable from the outside of the camera, Mo is a camera driving motor for driving a shutter mechanism and a film feeding mechanism (not shown) and S2 is a switch for controlling the current supply to the motor Mo, being so designed as to be closed with the second stroke of a release button RB. VC is a constant voltage circuit while Ec is an exposure control circuit for determining a proper aperture value basing upon such informations as the brightness of an object to be photographed, the sensitivity of a film, the chosen frame speed and so on, consisting of as is shown in the drawing, a light sensing element P (hereby a CdS element) for measuring the brightness of the object to be photographed, a variable resistance for inputting the film sensitivity information and the frame speed information and a compensation resistance Ro and designed so as to be supplied with current from the afore mentioned constant voltage circuit VC. Me is an exposure meter as a diaphragm driving means, being connected to the afore mentioned exposure control circuit EC, and the output shaft thereof is mechanically connected to a diaphragm D so as to adjust the aperture value in order to obtain a proper exposure in accordance with the output of the exposure control circuit EC. Further, the output shaft of the exposure meter Me is influenced by the force of a spring (not shown), so that when no current is supplied to the exposure meter the diaphragm D is kept at a position corresponding to the smallest or the largest aperture value. L is a photographing optical system of the camera while F is a film. $VR_B$ is a variable resistance as electrical diaphragm presetting means being, as is shown in the drawing, connected to the afore mentioned exposure control circuit EC so as to be in cooperation with the information inputting variable resistance $VR_A$ in the afore mentioned exposure control circuit EC and the compensation resistance Ro in order to determine the preset position of the diaphragm D. $S_3$ is a transfer switch as change over means, being operatively associated with the release button RB so as to be changed over from the contact a to the contact b with the first stroke of the release button RB, wherein the variable resistance $VR_B$ for the diaphragm presetting is connected to a contact a of the switch S3 while the constant voltage circuit VC is connected to a contact b of the switch S3.

In case of the above mentioned composition, before the power source switch S1 has been closed, the diaphragm is kept at the position corresponding to the smallest or the largest aperture value by the force of a spring acting upon the output shaft of the exposure meter Me, however when the above power source switch S1 is closed, a resistance circuit consisting of the diaphragm preset variable resistance $VR_B$, the information inputting variable resistance $VR_A$ and the compensation resistance Ro in the exposure control circuit EC is supplied with current from the power source B because the switch S3 is connected to the contact a in the state in which the release button RB is pushed down. Consequently, a current determined by the resistance of the resistance circuit runs through the exposure meter Me, whereby the output shaft rotates by the amount of the current against the force of the afore mentioned spring, accordingly the diaphragm D starts to move from the initial position and is preset at a position corresponding to the aperture value determined by the resistance value of the resistance circuit. Hereby, by means of adjusting the variable resistance $VR_B$, the preset position can be chosen to be such a one that the diaphragm D normally assumes for a mean object brightness. When then the release button RB is further pushed down, the switch S3 is changed over from the contact a to the contact b with the first stroke so that the variable resistance $VR_B$ for diaphragm presetting is excluded, while the constant voltage circuit VC is connected to the power source B, thereby a current is supplied to the exposure control circuit EC through the constant voltage circuit VC. Thus, the output shaft of the exposure meter Me rotates in accordance with the output of the exposure control circuit EC in such a manner that the diaphragm D is, starting from the afore mentioned preset position, adjusted in accordance with the output of the exposure control circuit EC, so as to assume the opening position for giving a proper exposure. When the switch S2 is closed with the second stroke of the release button RB, the motor Mo starts to operate so as to drive the shutter mechanism and the film feeding mechanism not shown in the drawing, so as to take pictures under proper exposure.

Hereby, the automatic exposure control device is accordance with the Japanese Patent Laid-Open Publication No. Sho 50-17223 has the composition and the effect as mentioned above, however, in this automatic exposure control device, the variable resistance $VR_B$ for the diaphragm presetting is connected to the exposure control circuit EC so as to be in cooperation with the information inputting variable resistance $VR_A$ and the compensation resistance Ro in the exposure control circuit EC in order to determined the preset position of the diaphragm D, so that the preset position of the diaphragm D alters in accordance with the sensitivity of the film F and the choosen frame speed and, therefore, there is a danger that such an inconvenience as has been pointed out at the beginning should take place if the above automatic exposure control device would be applied to a device of servo-type, namely the initial scene should be photographed under improper exposure in case an object with a low brightness would be photographed with a film with a high sensitivity. Besides, the this exposure control device, it is essential to prepare the constant voltage circuit VC for the exposure control circuit EC, which means an unprofitable increase of the loss of the power source. Further, in this device, the switch S3 of transfer type is used as change over means, however, in case of the transfer type switch, when the release button RB is operated slowly, the time during which the switch is changed over from the contact a to the contact b is prolonged, so that the once preset diaphragm D returns to the initial position during the time and, therefore, in spite of the fact that the diaphragm presetting means is provided, the initial scene is photographed under improper exposure in the same way as in case of the conventional device, which is inconvenient.

Below, embodiments of the present invention by which the above mentioned inconveniences can be eliminated will be explained in detail in accordance with FIG. 2 to FIG. 7.

Figure 2:
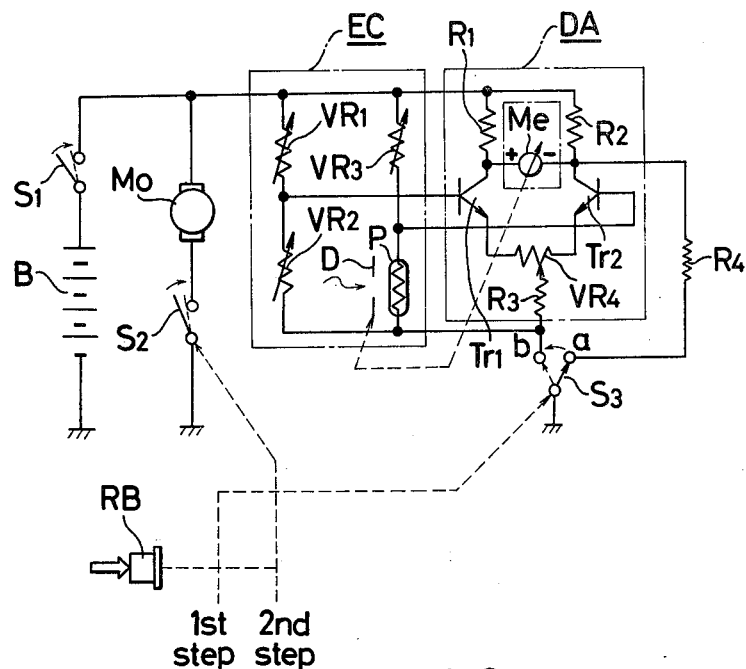
FIGS. 2 to 7 respectively show the circuit diagram of the first to the sixth embodiments of the automatic exposure control device of the present invention.

Firstly, FIG. 2 shows a first embodiment of a servo-type device according to the present invention. In FIG. 2, the members with same figures as those in FIG. 1 are the same members.

In this device, as the exposure control circuit EC, a bridge circuit is used, which consists of a variable resistance VR1 for inputting the information whether a color conversion filter is used or not, a variable resistance VR2 for inputting the frame speed information, a variable resistance VR3 for inputting the film sensitivity information and the light sensing element P, each member respectively making each leg of the bridge circuit. The exposure control circuit EC is connected between the power source switch S1 and the contact b of the transfer type switch S3. Hereby as light sensing element P a CdS element is used in the same way as in case of the conventional device shown in FIG. 1. Further, the light sensing element P is arranged so as to receive the light coming through the diaphragm D. However, the diaphragm D in this case is not necessarily be limited to the photographing diaphragm provided in the photographing light path shown in FIG. 1 but can be the one operatively engaged with the above, so as to exclusively serve to sense the light. Namely, the former one relates to a TTL servo-type device, while the latter one relates to a non TTL servo-type device. DA is a differential amplifier connected to the output terminal of the exposure control circuit EC, consisting of transistors Tr1, Tr2, resistances R1, R2, R3 with fixed resistance values, and a variable resistance VR4 for adjusting the "0" point. The exposure meter Me as diaphragm driving means is connected to the output terminal of the differential amplifier DA. Hereby, the differential amplifier DA is connected between the power source switch S1 and the contact b of the switch S3 in the same way as in case of the exposure control circuit EC. R4 is a resistance as diaphragm presetting means, being connected between the exposure meter Me and the contact a of the switch S3. The above is the construction different from that of the conventional device shown in FIG. 1. Before the power source switch S is closed, the diaphragm D is kept at the position corresponding to the smallest or the largest opening in the same way as in case of the conventional device. When the power source switch S1 is closed in this state, only the circuit consisting of the resistances R1, R2 in the differential amplifier DA, the exposure meter Me and the diaphragm presetting resistance R4 is supplied with current from the power source B because the switch S3 is connected to the contact a in the state in which the release button RB is operated, whereby because the resistance R1 is equal to the resistance R2 in resistance value a certain current determined by the resistance value of the resistance R4 runs through the exposure meter Me, thereby the output shaft of the meter Me rotates by the amount corresponding to the current amount and, therefore, the diaphragm D becomes preset at the opening position determined by the value of the diaphragm presetting resistance R4. When the release button RB is pushed down in this state, the switch S3 is changed over from the contact a to the contact b with the first stroke, so that the diaphragm presetting resistance R4 is excluded while a current is supplied to the exposure controlled circuit EC and the differential amplifier DA from the power source B. When at this time, the diaphragm D is not at the opening position for the proper exposure, the control circuit EC produces a corresponding unbalance output so as to drive the exposure meter Me through the differential amplifier DA, thereby the diaphragm D is adjusted at the opening position for the proper exposure in accordance with the output of the exposure control circuit EC. When the switch S2 is closed with the second stroke of the release button RB, the motor Mo starts to operate so as to drive the shutter mechanism and the film feeding mechanism not shown in the drawing in order to start photographing under proper exposure.

The embodiment shown in FIG. 2 presents the above mentioned composition as well as the above mentioned effect, and particularly in this embodiment, the exposure control circuit EC is completely excluded at the time of presetting the diaphragm D, so that the preset position of the diaphragm D is always determined at a certain opening position determined by the value of the diaphragm presetting resistance R4 without being influenced by the informations as to the sensitivity of the film to be used and as to whether the color conversion filter is used or not. Consequently, thus, the afore said inconvenience in the conventional device is completely eliminated and even in case of the servo-type device the diaphragm presetting effect can be obtained profitably. Hereby, the value of the diaphragm presetting resistance R4 is choosen in such a manner that the diaphragm is set at the opening position corresponding to 5-7 in the step number in case the largest opening position of the diaphragm D is "0" and the smallest opening position of the diaphragm D is "10", namely, the diaphragm D is set at the opening position corresponding to f8-f11 in case the largest aperture value is f1.4 and the smallest aperture value is f45. It goes without saying that the preset position can be other usual one, (namely, the opening position at which the diaphragm D adjusted for a mean brightness).

Further, in the embodiment shown in FIG. 2, the exposure control circuit EC is designed so as to operate properly by means of the power supplied from the power source B and does not need any constant voltage circuit, thereby the power loss due to the constant voltage circuit essential for the conventional device can largely be decreased.

Figure 3:
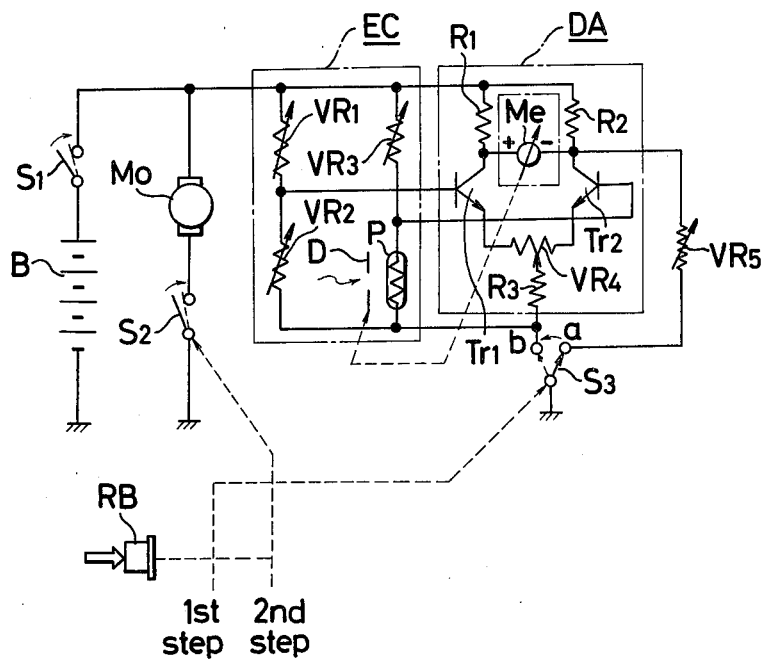

FIG. 3 shows a second embodiment of the present invention, in which a variable resistance VR5 is used instead of the resistance R4 in FIG. 2 as diaphragm presetting resistance. Hereby, the preset position of the diaphragm D can be adjusted correspondingly.

Figure 4:
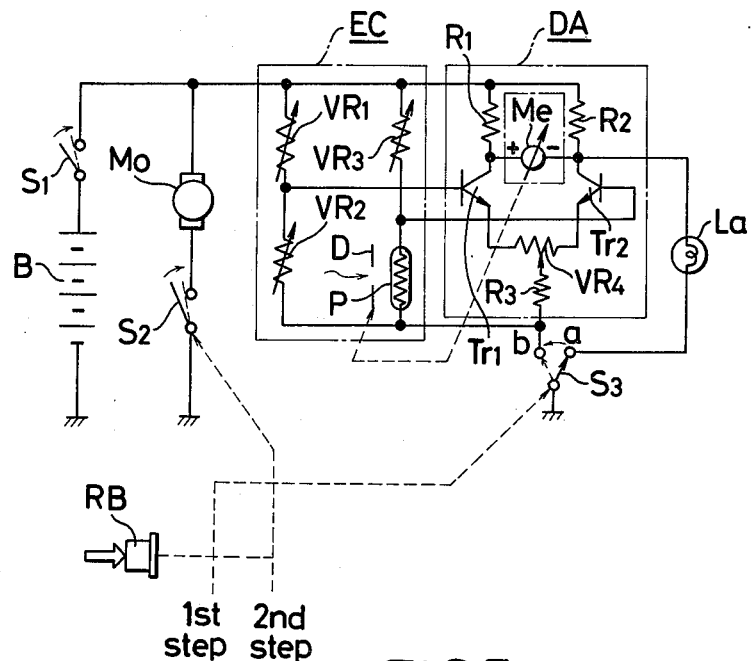

FIG. 4 shows a third embodiment of the present invention, in which a light emitting lamp La is used instead of the resistance R4 or the variable resistance VR5 shown in FIG. 2 or FIG. 3 as diaphragm presetting means. The lamp La serves as load resistance when it is lit, and, therefore, beside the presetting of the diaphragm D by means of the load resistance of the lamp La when it is lit, the indication as to whether the power source switch S1 is closed or not, the power source B is properly loaded or not and further the power source B is consumed or not can be obtained with the lightening of the lamp La.

Figure 5:
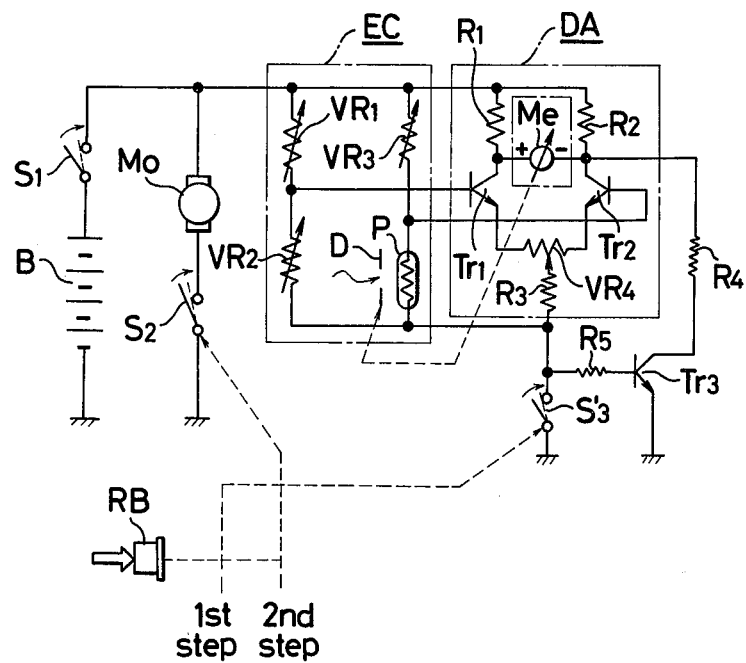

FIG. 5 shows a fourth embodiment of the present invention, in which as change over means for changing over from the diaphragm presetting resistance R4 to the exposure control circuit EC in response to the release button RB, a switching transistor and a usually opened switch are used in combination with each other instead of the transfer type switch S3 in the first embodiment shown in FIG. 2. Namely, the emitter of a switching transistor Tr3 is earthed, while the base is connected to a normally opened switch S'3 through a resistance R5. The switch S'3 is operately associated with the release button RB so as to be closed with the first stroke of the release button RB. Hereby, the diaphragm presetting resistance R4 is connected to the collector of the transistor Tr3 while the exposure control circuit EC and the differential amplifier DA is connected to the switch S'3.

In this composition, since the switch S'3 is opened in the state that the release button RB is not pushed down, so when the power source switch S1 is closed, the transistor Tr3 becomes conductive, thereby by means of the resistance R4 the diaphragm D is preset. When the switch S'3 is closed with the first stroke of the release button RB a current is supplied to the exposure control circuit EC and the differential amplifier DA, and at the same time, the base of the transistor Tr3 is at the earth potential, so that the transistor Tr3 becomes non-conductive, thereby the resistance R4 is excluded. Thus, according to this fourth embodiment, no matter how slowly the release button RB is pushed down, the changing over from the diaphragm presetting resistance R4 to the exposure control circuit EC is instantaneously performed, so that the inconvenience which arises when the release button RB is operated slowly at the use of the transfer type switch S3 as change over means is completely eliminated.

Figure 6:
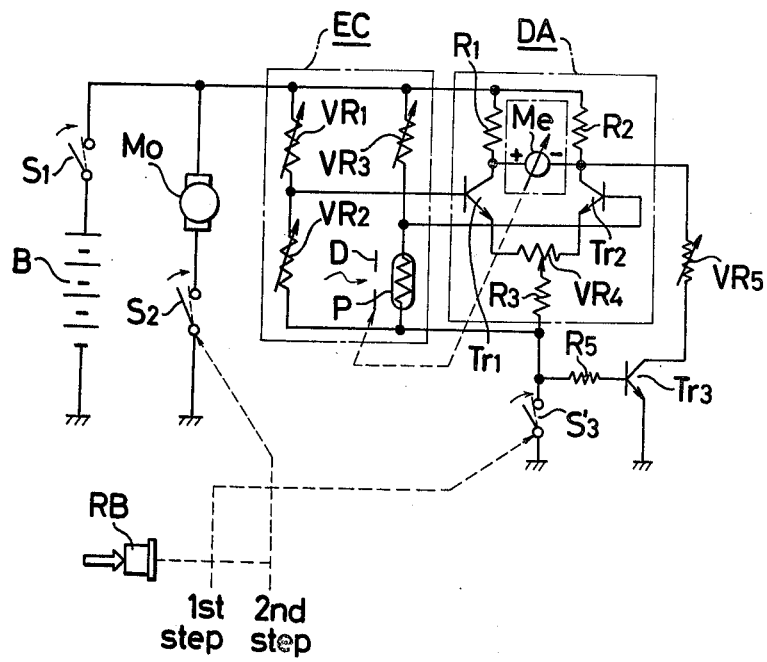

FIG. 6 shows a fifth embodiment of the present invention, in which the same improvement as in case of the fourth embodiment shown in FIG. 5 is applied to the second embodiment shown in FIG. 3, namely, as change over means, the combination of the switching transistor Tr3 and the normally opened switch S'3 is used instead of the transfer type switch S3.

Figure 7:
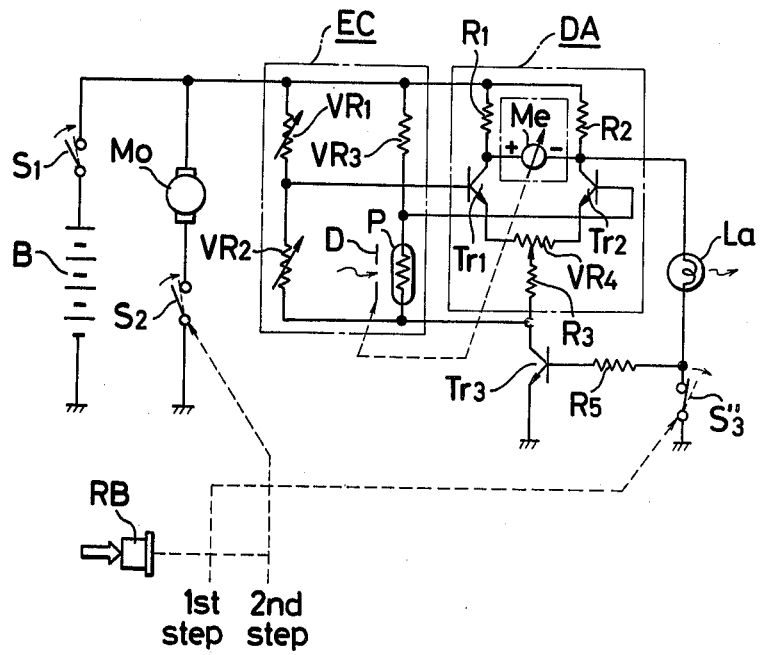

Lastly, FIG. 7 shows a sixth embodiment of the present invention, in which the same improvement as in case of the fourth and the fifth embodiments shown in FIG. 5 and FIG. 6 is applied to the third embodiment shown in FIG. 4. Hereat, instead of the normally opened switch S'4 shown in FIG. 5 and FIG. 6, a normally closed switch S''3 to be opened with the first stroke of the release button RB is used, and in this case the light emitting lamp La is connected to the switch S''3, while the exposure control circuit EC and the differential amplifier DA are connected to the collector of the switching transistor Tr3.

In this composition, since the switch S''3 is closed in the state that the release button RB is not pushed down, so when the power source switch S1 is closed, the lamp La is lit, thereby the diaphragm D is preset by means of the load resistance of the lamp La, and at this time, since the transistor Tr3 is non-conductive, the exposure control circuit EC is excluded. Ane then the switch S''3 is opened with the first stroke of the release button RB, the lamp La is excluded while at the same time the transistor Tr3 becomes conductive, thereby a current is supplied to the exposure control circuit EC and the differential amplifier DA.

As explained above in detail, according to the present invention, all the shortcomings which arise in the conventional automatic exposure control device are completely eliminated, and a novel automatic exposure control device which is profitably convenient for a camera can be achieved.

Hereby, all of the embodiments are explained as the TTL servo-type device or the non TTL servo-type device in the present specification, however, it goes without saying that they can be applied to the non servo-type device as is shown in FIG. 1. Further, although all of the embodiments are intended for motion picture camera, the present invention is not limited to the motion picture camera. The same effect can be obtained even when the present invention is applied to other devices.

What is claimed is:

1. For a camera having release means, an automatic exposure control system comprising:
   (A) a diaphragm means having a range of operating positions;
   (B) a driving means for driving and setting said diaphragm means to a position within said range;
   (C) an exposure control means of controlling said driving means so as to set said diaphragm means to a position within said range at which position a proper exposure value is attained, said control means including a light measuring element illuminatable by light from a scene and electrical elements for entering other exposure factors and electrically coupled to said driving means, and determining said proper exposure value in accordance with the output of said light measuring element and other exposure factors entered in said electrical elements;
   (D) a diaphragm presetting means for controlling said driving means so as to set said diaphragm means to a predetermined intermediate position in said range, said presetting means being electrically coupled with said driving means and electrically operable independently of said exposure control means; and
   (E) a change-over means for selecting one of said diaphragm presetting means and said exposure control means, said change-over means being operatively associated with said camera release means so as to make said exposure control means inoperative and said presetting means operative when the release means is not actuated and to make said presetting means inoperative and said exposure control means operative when the release means is actuated.

2. The system according to claim 1, wherein said diaphragm presetting means is a resistor having a predetermined resistance value.

3. The system according to claim 1, wherein said diaphragm presetting means is an adjustable resistor having a plurality of resistance values.

4. The system according to claim 1, wherein said diaphragm presetting means is a lamp working as load resistance when it is lit.

5. The system according to claim 1, wherein said changeover means is a transfer type switch having a first and second fixed contacts and a third movable contact which normally contacts said first contact and changeable from the first contact to said second contact in response to said camera release means; said diaphragm presetting means is electrically connected to said first contact; and said exposure control means is electrically connected to said second contact.

6. The system according to claim 1, wherein said change-over means comprises:
   a semiconductive switching element having a control terminal; and
   a mechanical switch electrically connected to said control terminal of the switching element and responsive to said camera release means;
   one of said diaphragm presetting means and said exposure control means being electrically connected to said semiconductive switching element and the other being electrically connected to said mechanical switch.

7. The system according to claim 1, wherein said exposure control means is a bridge circuit comprising said light measuring element and said electrical elements as the legs thereof and having an output circuit; said driving means being electrically connected to said output circuit.

8. The system according to claim 7, wherein said light measuring element is a photoconductive element.

9. For a camera having a power supply circuit and a camera release means, an automatic exposure control system comprising:
   (A) a diaphragm means having a range of operating positions;
   (B) urging means urging said diaphragm means to a predetermined end position in said range;
   (C) a driving means for normally overcoming said urging means to drive and set said diaphragm means to a position in said range;
   (D) an exposure control means for controlling said driving means so as to set said diaphragm means to a position within said range at which position a proper exposure value is attained, said control means including a light measuring element illuminatable by light from a scene coming through said disphragm means and electrical elements for entering other exposure factors and being electrically coupled to said power supply circuit and said driving means, and determining said proper exposure value in accordance with the output of said light measuring element and other exposure factors entered in said electrical elements;
   (E) a diaphragm presetting means for controlling said driving means so as to set said diaphragm means to a predetermined position intermediate in said range, said presetting means being electrically coupled with said power supply circuit and said driving means and electrically operable independently of said exposure control means; and
   (F) a change-over means for selecting one of said diaphragm presetting means and said exposure control means, said change-over means being operatively associated with said camera release means so as to make said exposure control means inoperative and said presetting means operative when the release means is not actuated and to make said presetting means inoperative and said exposure control means operative when the release means is actuated.

10. The system according to claim 9, wherein said diaphragm presetting means is a resister having a predetermined resistance value.

11. The system according to claim 9, wherein said diaphragm presetting means is an adjustable resistor having a plurality of resistance values.

12. The system according to claim 9, wherein said diaphragm presetting means is a lamp working as load resistance when it is lit.

13. The system according to claim 9, wherein said change-over means is a transfer type switch having a first and second fixed contacts and a third movable contact which normally contacts with said first contact and changeable from the first contact to said second contact in response to said camera release means; said diaphragm presetting means is electrically connected to said first contact; and said exposure control means is electrically connected to said second contact.

14. The system according to claim 9, wherein said change-over means comprises:
- a semiconductive switching element having a control terminal; and
- a mechanical switch electrically connected to said control terminal or the switching element and responsive to said camera release means;
- one of said diaphragm presetting means and said exposure control means is being electrically connected to said semiconductive switching element and the other is being electrically connected to said mechanical switch.

15. The system according to claim 9, wherein said exposure control means is a bridge circuit comprising said light measuring element and said electrical elements as the legs thereof and having an output circuit; said driving means is electrically connected to said output circuit.

16. The system according to claim 15, wherein said light measuring element is a photoconductive element.

* * * * *